United States Patent
Nezu

(10) Patent No.: US 9,958,098 B2
(45) Date of Patent: May 1, 2018

(54) TUBULAR-MEMBER LOCK MECHANISM

(71) Applicant: NIFCO INC., Yokosuka-shi, Kanagawa (JP)

(72) Inventor: Mikio Nezu, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days. days.

(21) Appl. No.: 15/125,365

(22) PCT Filed: Mar. 12, 2015

(86) PCT No.: PCT/JP2015/057343
§ 371 (c)(1),
(2) Date: Sep. 12, 2016

(87) PCT Pub. No.: WO2015/141557
PCT Pub. Date: Sep. 24, 2015

(65) Prior Publication Data
US 2017/0074444 A1    Mar. 16, 2017

(30) Foreign Application Priority Data
Mar. 17, 2014    (JP) .................................. 2014-053251

(51) Int. Cl.
*F16L 39/00*    (2006.01)
*F16L 37/088*    (2006.01)
(Continued)

(52) U.S. Cl.
CPC .......... *F16L 37/088* (2013.01); *F16B 7/0406* (2013.01); *F16L 37/1225* (2013.01); *F16L 37/14* (2013.01); *F16B 2/248* (2013.01)

(58) Field of Classification Search
CPC ...... F16L 37/088; F16L 37/0841; F16L 37/10
(Continued)

(56) References Cited

U.S. PATENT DOCUMENTS 2,039,787 A * 5/1936 Fogelström ............. F16L 37/10
285/111
2,805,089 A * 9/1957 Hansen ................ F16L 37/088
285/317
(Continued)

FOREIGN PATENT DOCUMENTS

JP    H10-9470 A       1/1998
JP    2004-125130 A    4/2004
JP    2014-15969 A     1/2014

OTHER PUBLICATIONS

PCT International Search Report of PCT/JP2015/057343.
Europe Patent Office, "Search Report for European Patent Application No. 15764656.3," dated Oct. 18, 2017.

*Primary Examiner* — Aaron M Dunwoody
(74) *Attorney, Agent, or Firm* — Manabu Kanesaka

(57) ABSTRACT

A tubular-member lock mechanism includes a cylindrical housing to which a tubular member having an engagement portion at one end is mounted, and a lock member for engaging or releasing the housing and the tubular member. The housing includes a lock-member guide wall turnably guiding the lock member, at least two sliding surfaces with different inclinations wherein a tip portion of the lock member slides by turning the lock member, and a slit through which one portion of the lock member passes to engage the engagement portion of the tubular member mounted to the housing. The lock member, at a standby/lock position, engages the engagement portion formed on an outer periphery of the tubular member, and the lock member, at a release position where a rotational load is applied, spreads by the sliding surfaces having the different inclinations releases the engagement portion of the tubular member.

10 Claims, 11 Drawing Sheets

(51) Int. Cl.
*F16L 37/14* (2006.01)
*F16B 7/04* (2006.01)
*F16L 37/12* (2006.01)
*F16B 2/24* (2006.01)

(58) Field of Classification Search
USPC .................. 285/321, 308, 305, 33, 315, 314
See application file for complete search history.

(56) References Cited

U.S. PATENT DOCUMENTS

| | | | | |
|---|---|---|---|---|
| 2,898,130 | A * | 8/1959 | Hansen | F16L 37/088 |
| | | | | 137/614.04 |
| 3,428,340 | A * | 2/1969 | Pelton | F16L 17/06 |
| | | | | 277/613 |
| 5,855,399 | A | 1/1999 | Profunser | |
| 6,371,528 | B1 | 4/2002 | Kimura | |
| 7,695,024 | B2 * | 4/2010 | Ostergren | F16L 37/088 |
| | | | | 285/305 |
| 2011/0067225 | A1 | 3/2011 | Bassaco | |
| 2015/0167880 | A1 * | 6/2015 | An | F16L 37/088 |
| | | | | 285/400 |
| 2015/0176738 | A1 * | 6/2015 | Nezu | F16L 37/088 |
| | | | | 285/321 |
| 2015/0276108 | A1 * | 10/2015 | Ye | F16L 37/088 |
| | | | | 285/321 |

* cited by examiner

TUBULAR-MEMBER LOCK MECHANISM

FIELD OF TECHNOLOGY

The present invention relates to a tubular-member lock mechanism used for connecting fluid pipe and the like, and relates to the tubular-member lock mechanism which can quickly and reliably connect and release pipe for an automobile.

BACKGROUND ART

Conventionally, a tubular-member lock mechanism has a structure of switching a lock position and a release position of a lock-mechanism main member and a tubular member by rotationally operating a fastener (lock member) attached to the lock-mechanism main member.

For example, a tubular-member lock mechanism as shown in Patent Document 1 comprises a fastener (lock member) formed by a locking arm made of an elastic member and mounted to a vicinity of a notch groove of a female pipe (lock-mechanism main member), and a fastener projecting portion, and has a structure wherein the tubular member is locked by the fastener entered from the notch groove of the female pipe, and is released by pushing the projecting portion of the fastener to turn so that the locking arm opens to disengage from the tubular member.

In the fastener (lock member), at the lock position, the locking arm of the fastener protrudes radially inwardly from the notch groove to retain the tubular member.

Also, at the release position, the projecting portion turns so that the locking arm opens as an operation point of an end portion of the notch groove, and moves from an inside of the female pipe in an opening direction so as to be disengaged from the tubular member (Patent Document 1).

PRIOR ART DOCUMENT

Patent Document

Patent Document 1: Japanese Unexamined Patent Application Publication No. H10-9470

SUMMARY OF THE INVENTION

Problems to be Solved by the Invention

In a case of the conventional Patent Document 1, however, when the elastic member (fastener) opens for releasing, in order to open one portion of the end portion of the notch groove as the operation point, a large force is required for a release operation. Namely, a distance from an open base point of the locking arm to the end portion (operation point) of the notch groove is short, and a large expansion moment is required. Also, structurally, in order to completely lift the locking arm of the fastener from the notch groove, a large force is required for a turning operation as well.

Also, the fastener projecting portion protrudes in an upper direction, so that a whole external diameter size becomes larger.

An object of the present invention is to provide a tubular-member lock mechanism which can solve the aforementioned problems.

Means for Solving the Problems

In order to obtain the aforementioned object, the present invention provides a tubular-member lock mechanism comprising a cylindrical housing to which a tubular member provided with an engagement portion at at least one end is mounted; and a lock member that can engage and release the housing and the tubular member, wherein the housing is provided with a lock-member guide wall turnably guiding the lock member; at least two sliding surfaces wherein a tip portion slides accompanied by turning of the lock member, and having different inclinations from each other; and a slit through which one portion of the lock member passes to engage the engagement portion of the tubular member mounted to the housing. The lock member, at a standby/lock position, engages the engagement portion formed on an outer periphery of the tubular member passing through at the slit by an elastic force of the lock member, and the lock member, at a release position where a rotational load is applied, spreads by the sliding surfaces having the different inclinations to be released from the engagement portion of the tubular member.

It is preferable that when the rotational load is applied, and the lock member is spread by the sliding surfaces, the lock member abuts against an end portion of the slit as well and is spread. According to the preferred aspect, a release operation can be carried out by a small force with a plurality of expansion moments. Also, since the lock member abuts against the end portion of the slit as well and is spread, leg portions of the lock member directly related to unlocking can be spread larger, and a tip of the lock member does not spread more than necessary to protrude from the outer periphery. Moreover, the release operation can be completed with a small turning angle.

It is preferable that the lock member includes a bent portion bent in an axis direction of the housing, and the rotational load is applied to the bent portion and is operated so that the lock member is spread. According to the preferred aspect, one's finger can be easily hooked on the bent portion and the release operation can be easily carried out. Also, a release by a tool is unnecessary.

It is preferable that at one portion of the lock-member guide wall, there is formed a gap controlling a turning range of the bent portion of the lock member. According to the preferred aspect, the lock member is prevented from excessive turning and falling off so as to perform a stable operation.

It is preferable to provide a falling prevention member covering the gap of the lock-member guide wall from above with a predetermined interval to prevent the lock member from falling off. According to the preferred aspect, the lock member can be prevented from falling off so as to improve safety.

It is preferable that when a turning load is released, the lock member is formed to return to the standby/lock position by its own elastic force. According to the preferred aspect, after being unlocked, there is no need of returning the lock member to a standby state further so as to excel in operability. Therefore, a release work is simple.

It is preferable that the lock member is formed by a metal wire material having elasticity. According to the preferred aspect, lock strength can be obtained, and the tubular member can be reliably fixed to a lock mechanism. Also, the tubular-member lock mechanism with excellent durability can be provided. Moreover, the lock member can be provided with a low price while securing strength of the lock member.

It is preferable that the tubular member is structured to cut off a flow of a fluid. According to the preferred aspect, the fluid can be cut off only by mounting the tubular member.

Effect of the Invention

According to the present invention, the lock member is spread by the tip portion so as to carry out the release operation by the small force. Also, the lock member is spread by the sliding surfaces of the different inclinations so as to complete the release operation within a smaller turning range. Furthermore, the lock member does not protrude in an outer circumferential direction, and even in a narrow place, the operation is possible. Also, the release by the tool is unnecessary, and there is no possibility to damage a periphery thereof by the tool.

BEST MODES OF CARRYING OUT THE INVENTION

A tubular-member lock mechanism according to one embodiment of the present invention comprises a cylindrical housing wherein a tubular member provided with an engagement portion is mounted to at least one end; and a lock member that can engage and release the housing and the tubular member. The housing includes a lock-member guide wall turnably guiding the lock member; sliding surfaces wherein tip portions slide accompanied by turning of the lock member; and slits through which the lock member partially passes to engage the engagement portion of the tubular member mounted to the housing. In the lock member, at a standby and lock position, one portion passing through the slits can engage, by an elastic force, the engagement portion formed on an outer periphery of the tubular member, and at a release position where a rotational load is applied, the lock member is spread by the two sliding surfaces of different inclinations to be released from the engagement portion of the tubular-member so as to carry out a release operation by a small force. Also, since the lock member is spread by the two sliding surfaces of the different inclinations, the release operation can be made within a small turning range.

Figure 1:
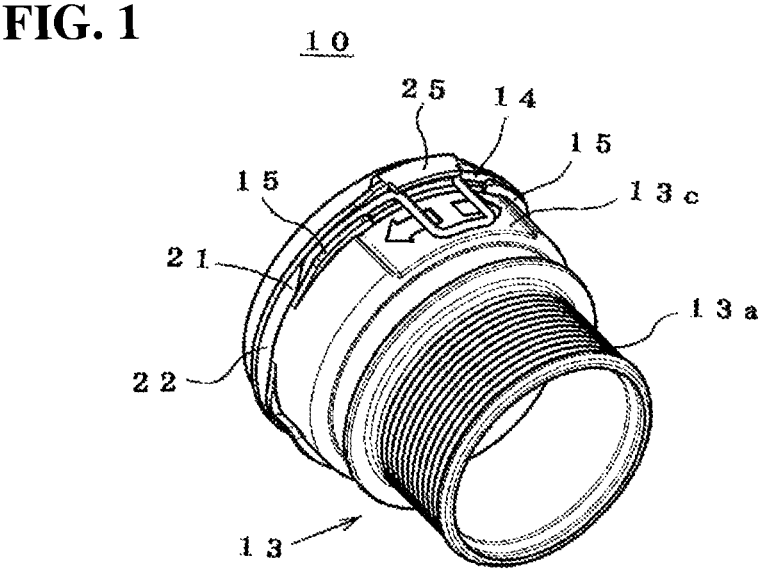
FIG. 1 is a perspective view showing a tubular-member lock mechanism according to one embodiment of the present invention.
Figure 2:
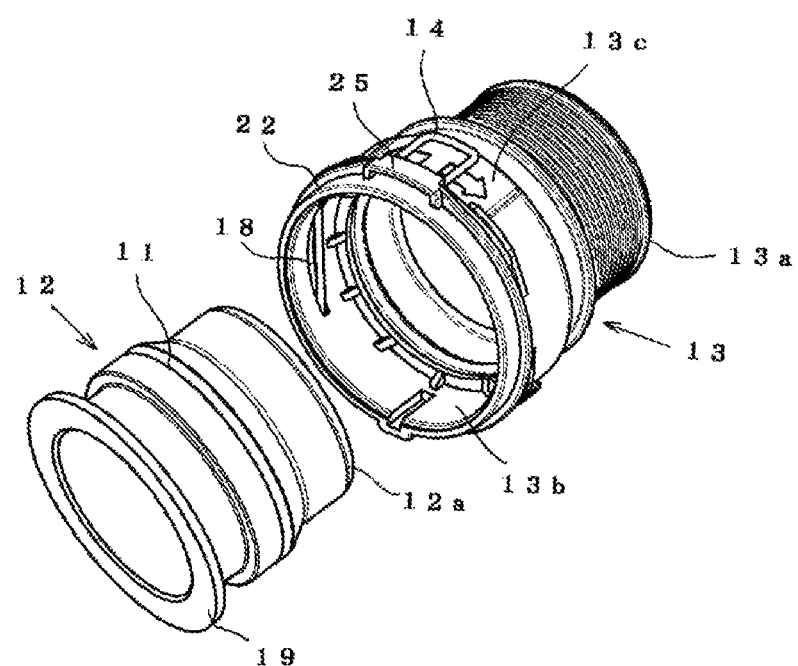
FIG. 2 is a perspective view showing the lock mechanism and a tubular member.
Figure 3:
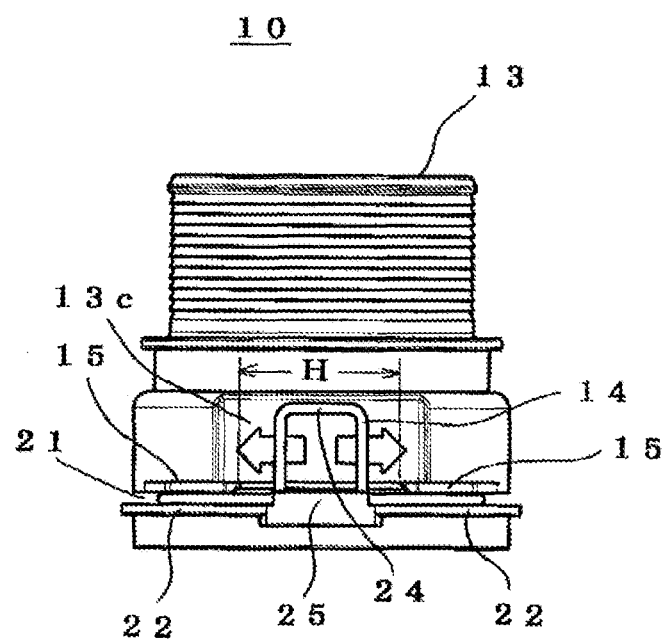
FIG. 3 is a plan view showing the lock mechanism.
Figure 4:
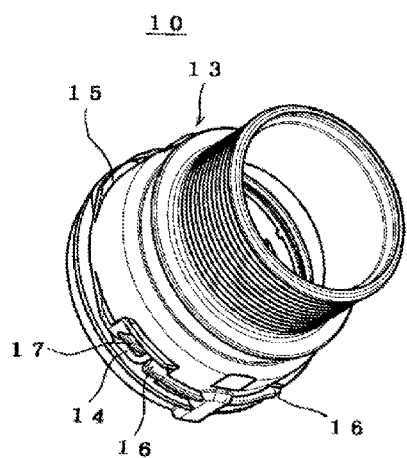
FIG. 4 is a perspective view from a lower side showing the lock mechanism.
Figure 5:
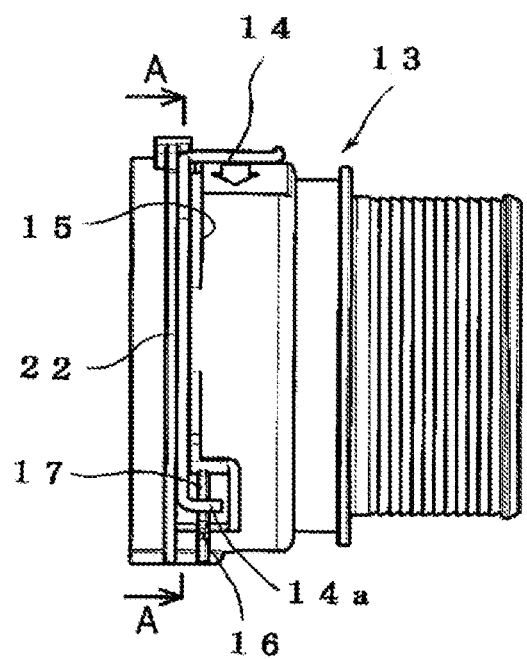
FIG. 5 is a side view showing the lock mechanism.
Figure 6:
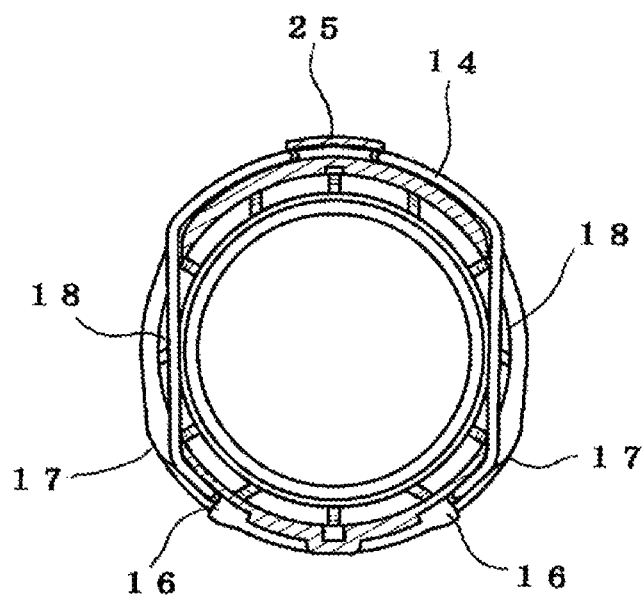
FIG. 6 is a cross-sectional view taken along a line A-A in FIG. 5.

Hereinafter, the present invention will be explained in details based on the drawings showing one embodiment. FIG. 1 is a perspective view showing the tubular-member lock mechanism according to one embodiment of the present invention; FIG. 2 is a perspective view showing the lock mechanism and the tubular member of the present invention; FIG. 3 is a plan view showing the lock mechanism of the present invention; FIG. 4 is a perspective view from a lower side showing the lock mechanism of the present invention; FIG. 5 is a side view showing the lock mechanism of the present invention; and FIG. 6 is a cross-sectional view taken along a line A-A in FIG. 5. Here, a tubular-member lock mechanism 10 comprises a cylindrical housing 13 wherein a tubular member 12 (see FIG. 2) provided with an engagement portion 11 is mounted to at least one end; and a lock member 14 which can engage and release the housing 13 and the tubular member 12. The housing 13 includes a lock-member guide wall 15 turnably guiding the lock member 14; first sliding surfaces 16 and second sliding surfaces 17 (see FIG. 5 and FIG. 6) wherein tip portions 14a slide accompanied by the turning of the lock member 14; and slits 18 (see FIG. 6) through which the lock member 14 partially passes to engage the engagement portion 11 of the tubular member 12 mounted to the housing 13. In the lock member 14, in a non-load state, portions passing through the slits 18 by the elastic force engage the engagement portion 11 formed on the outer periphery of the tubular member, and when the rotational load is applied, the lock member 14 is spread by the two first and second sliding surfaces 16 and 17 of the different inclinations to be released from the engagement portion 11 of the tubular member 12 so as to carry out the release operation by the small force. Incidentally, the engagement portion 11 will be explained in a case of an annular groove; however, it may be an engagement step portion.

The tubular member 12 is made of, for example, synthetic resin and the like, forms a cylinder shape, and includes a flange 19 at a base end portion where a hose is connected, and on an outer periphery of an approximately intermediate portion, there is formed the engagement portion 11 which is the annular groove (see FIG. 2). Also, a tip portion 12a mounted to the housing 13 is tapered, and just before the engagement portion 11, the tip portion 12a is enlarged in a conical shape. Moreover, the tubular member 12 may be structured to cut off a fluid in the same manner as a closing plug or a plug cap (blind lid).

The housing 13 includes a hose connection portion 13a at one end wherein the hose is connected; and a mounting opening 13b at the other end wherein the tubular member 12 is mounted (see FIG. 2). The housing 13 is made of, for example, synthetic resin and the like. Also, on an outer periphery of the hose connection portion 13a, there is included a plurality of annular concave and convex portions for retaining the hose (see FIG. 1). Also, in an outer peripheral top portion of the expanded mounting opening 13b, there is formed a lock-member guide wall 15 from a center top portion to right and left including a gap H controlling a turning range of a bent portion 24 of the lock member 14 (see FIG. 3). Also, there is disposed a flange 22 facing the lock-member guide wall 15 to form a holding groove 21 turnably holding the lock member 14 along an outer periphery of the housing 13. Moreover, in a portion (in a vicinity of a top portion of the housing) corresponding to the bent portion 24 of the lock member 14 on the outer periphery of the housing 13, there is formed a shallow groove portion 13c. Also, on the outer periphery of the housing 13, there are formed the slits 18 through which leg portions 14b of the lock member 14 held between the lock-member guide wall 15 and the flange 22 can pass (see FIG. 2), and the leg portions 14b engage the engagement portion 11 formed on the outer periphery of the tubular member 12 mounted to the housing 13.

At a center top portion of the flange 22, there is formed a falling prevention member 25 covering the gap H of the lock-member guide wall 15 with a predetermined interval to prevent the lock member 14 from falling off (see FIGS. 1, 3, and 6). A size in a circumferential direction of the falling prevention member 25 is smaller than a size in a circumferential direction of the gap H.

Figure 14:
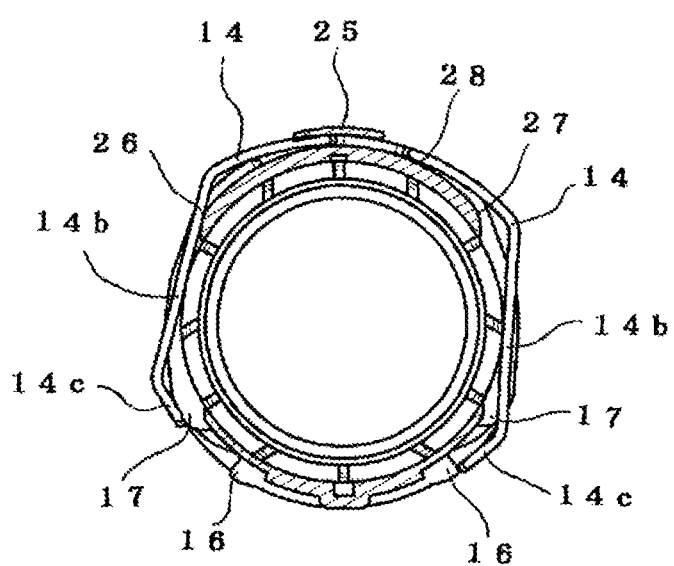
FIG. 14 is a cross-sectional view taken along a line A-A in FIG. 13.

Also, at a lower end of the outer periphery of the housing 13, there are formed pairs of the first sliding surfaces 16 and the second sliding surfaces 17, at right-and-left symmetrical positions (see FIG. 14). The first sliding surface 16 and the second sliding surface 17 are disposed opposite to each other, and respectively include the different inclinations. In the present embodiment, the first sliding surface 16 is formed with a large inclination angle, and the second sliding surface 17 is formed with a small inclination angle. Namely, the first sliding surface 16 has a steep inclination, and the second sliding surface 17 has a gentle inclination. Then, the tip portion 14a of the lock member 14 held between the lock-member guide wall 15 and the flange 22 is disposed in such a way as to abut against the first sliding surface 16 or the second sliding surface 17 accompanied by the turning thereof. As shown in FIGS. 4 and 14, and the like, in the present embodiment, the first sliding surface 16 has an approximately vertical inclination, and the second sliding surface 17 is formed with a gentle arc-shaped inclination.

At a deep end of the mounting opening 13b of the housing 13, there is disposed a seal member such as an O-ring or the like to assure water-tightness and air-tightness between the mounting opening 13b of the housing 13 and the mounted tubular member 12. Incidentally, the seal member is not limited to the O-ring, and may be another seal member such as a V-ring, an X-ring, or the like.

Figure 7:
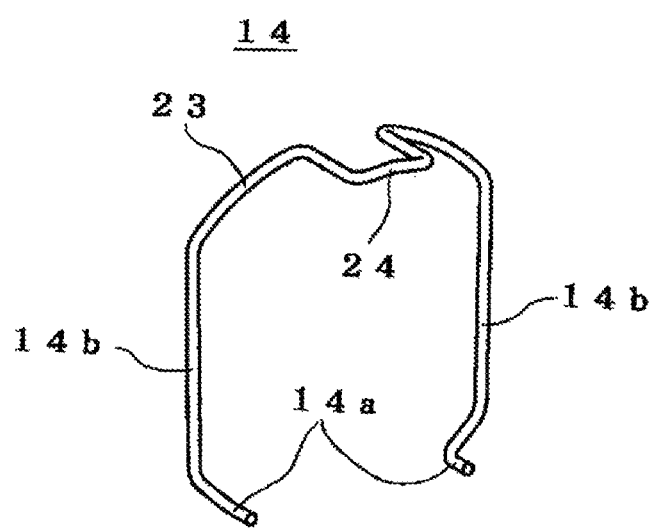
FIG. 7 is a perspective view showing a lock member used for the lock mechanism.
Figure 8:
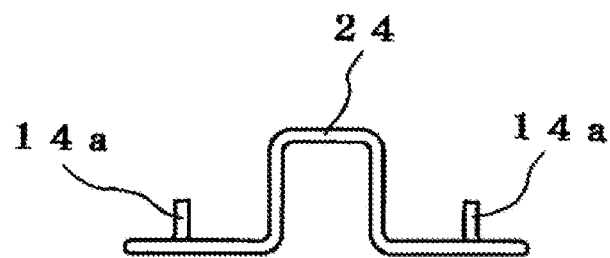
FIG. 8 is a plan view showing the lock member.
Figure 9:
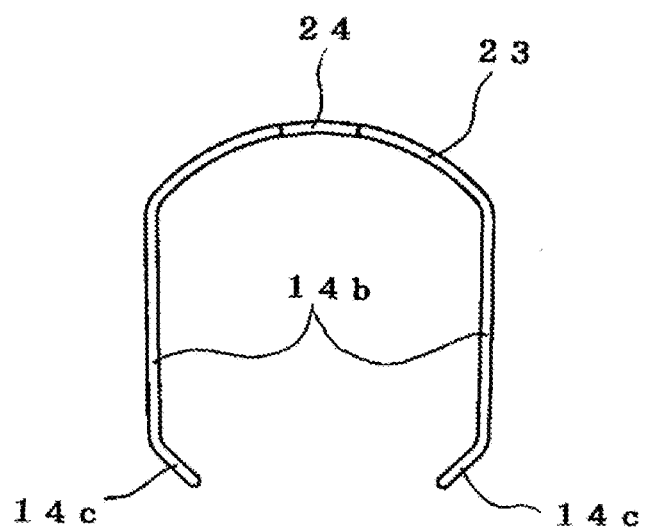
FIG. 9 is a front view showing the lock member.
Figure 10:
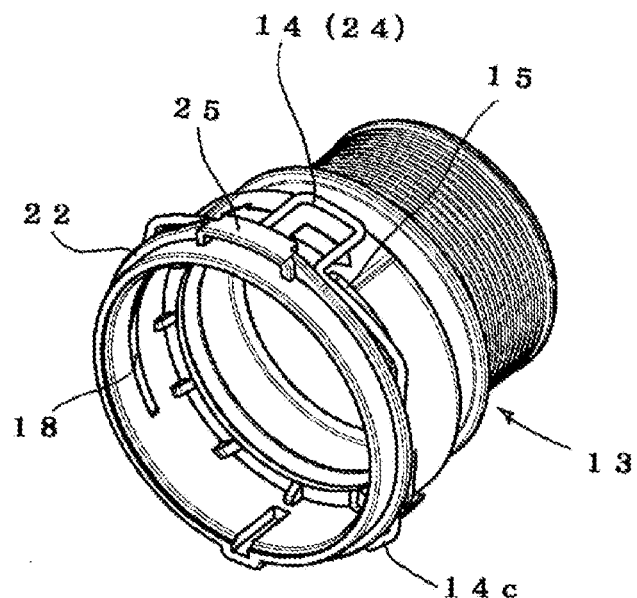
FIG. 10 is a perspective view showing a release state of the lock mechanism.
Figure 11:
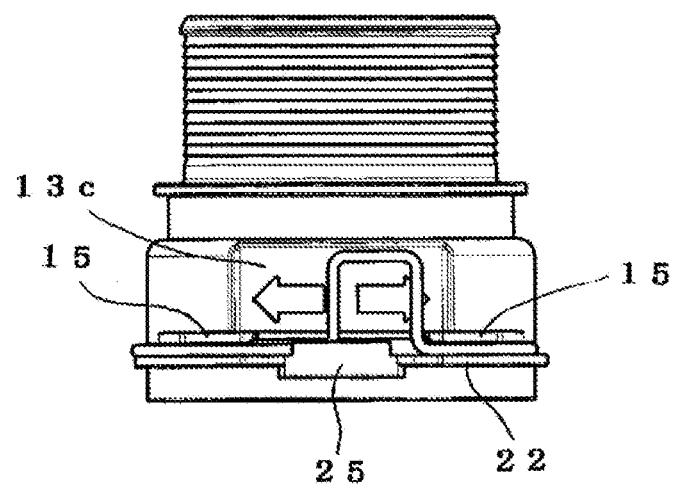
FIG. 11 is a plan view showing the release state of the lock mechanism.
Figure 12:
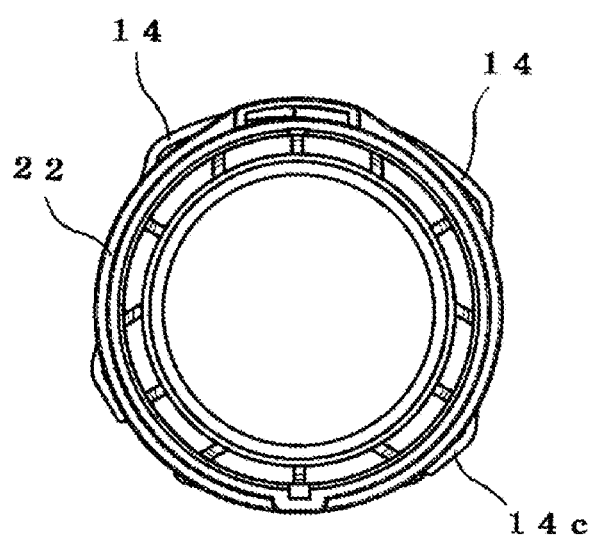
FIG. 12 is a front view showing the release state of the lock mechanism.

As shown in FIGS. 7 to 9, the lock member 14 is formed by, for example, an elastic wire material made of metal formed to bend (see FIG. 7) in such a way as to have a connection portion 23 convexly curved upward; the leg portions 14b roughly linearly extended respectively from both sides (both sides in a width direction) of the connection portion 23; and the tip portions 14a formed to bend in a direction perpendicular to the leg portions 14b from bent portions 14c (see FIG. 9) of tips of the leg portions 14b inwardly bent. Also, at a top portion of the connection portion 23, there is formed the C-shaped bent portion 24 protruding in an axis direction of the housing 13 (see FIG. 7), and a rotational load can be applied to the bent portion 24 to operate. Also, the bent portion 24 has a size smaller than that of the gap H of the lock-member guide wall 15 formed in the housing 13, and is housed herein. Moreover, a diameter of the leg portion 14b is smaller than a width of the slit 18 so as to pass through the slit 18. A length of the leg portion 14b is formed longer than a length (height) of the slit 18. Incidentally, the lock member 14 may be a plate material made of metal or synthetic resin. Namely, it is not limited to a wire material, and even if it is formed by a slender plate material, the same effect can be obtained.

In a case wherein the tubular-member lock mechanism 10 formed in the aforementioned manner is assembled, first, the lock member 14 is attached to the housing 13 from an upper direction. In an attachment procedure of the lock member 14, when the leg portions 14b are inserted into the holding groove 21 between the lock-member guide wall 15 and the flange 22 in such a way as to open the leg portions 14b to right and left, and are released, the tip portions 14a are positioned between the first sliding surfaces 16 and the second sliding surfaces 17 by an elastic force of the wire material. Also, in the present embodiment, the bent portion 24 and the tip portions 14a of the lock member 14 are attached to direct the hose connection portion 13a of the housing 13. The attached leg portions 14b protrude partly to the mounting opening 13b from the slit 18 of the housing 13. In that state, as shown in FIG. 2, when the tubular member 12 is mounted from the mounting opening 13b, the leg portions 14b are engaged with the engagement portion 11 after being pushed to spread in an outer peripheral direction at the tip portion 12a formed tapered and a portion enlarged in the conical shape just before the engagement portion 11. In a state wherein the leg portions 14b are engaged with the engagement portion 11, the O-ring is positioned between an outer periphery of the tip portion 12a of the tubular member 12 and an inner periphery of the mounting opening 13b of the housing 13, and is pressed so as to retain water-tightness and air-tightness.

Figure 13:
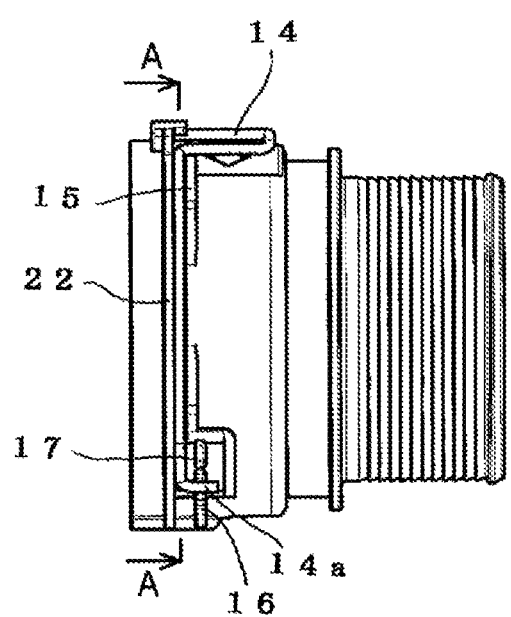
FIG. 13 is a side view showing the release state of the lock mechanism.

In a case wherein an engagement between the tubular member 12 and the housing 13 is released, as shown in FIG. 10 to FIG. 14, first, the bent portion 24 of the lock member 14 turns in any of right and left directions. At that time, since the shallow groove portion 13c of the housing 13 is formed at the portion corresponding to the bent portion 24, one's finger can be easily hooked on the lock member 14 to easily turn. As shown in FIGS. 13 and 14, when the bent portion 24 is turned, one tip portion 14a (a right side in FIG. 14) of the lock member 14 is pushed to ride on the first sliding surface 16, and spreads in the outer peripheral direction. At that time, one portion of the connection portion 23 abuts against a supporting point 28 which is one portion of the flange 22, and expands here as the supporting point. Namely, the leg portions 14b can open with a large moment around the supporting point 28 as an operation point of the tip portions 14a. Moreover, the first sliding surface 16 has the approximately vertical inclination so as to largely spread the leg portions 14b of the lock member 14 even by a short pivoting stroke, to thereby shorten a pivoting stroke of the lock member 14.

Also, the tips of the leg portions 14b of the lock member 14 are formed as the bent portions 14c inwardly bent, so that even if the leg portions 14b are open, they almost don't protrude from the outer periphery of the housing 13 (see FIG. 14). Moreover, the turning range of the bent portion 24 is restricted by the gap H formed in the lock-member guide wall 15, so that there is no possibility such that the lock member 14 falls off by turning excessively.

The other tip portion 14a (a left side in FIG. 14) of the lock member 14 is pulled to ride on the second sliding surface 17, and spreads in the outer peripheral direction as a supporting point of an end edge 26 of the slit 18. Namely, at the beginning of the release operation, only tip portion 14a rides on the second sliding surface 17, so that the beginning of a movement is light. Moreover, when the tip portion 14a turns, the tip portion 14a opens as the supporting point of the end edge 26 and as the operation point of the tip portion 14a of the lock member 14, so that the tip portion 14a spreads larger by the short pivoting stroke and is released from the engagement portion 11.

In this manner, the respective tip portions 14a open, so that the leg portions 14b spread to right and left, and are disengaged from the engagement portion 11 of the tubular member 12 so as to release the engagement, and the tubular member 12 can be pulled out (see FIG. 2).

In the present invention, the release operation can be carried out only by an operation of turning the bent portion 24 of the lock member 14 simply in a lateral (a circumference of the housing) direction so as to have no protruding portion, and even in a narrow place, the release can be performed. Also, the lock member 14 is opened by the sliding surfaces of the first sliding surface 16 and the second sliding surface 17 of the different inclinations so as to carry out the release operation by the small force. Namely, even in a lock state or a release state, the bent portion 24 does not protrude so as to allow an operation in a narrow and small space.

Moreover, after the release, when one's finger is lifted from the bent portion 24, one tip portion 14*a* descends along the first sliding surface 16 by its own elastic force, the other tip portion 14*a* descends along the second sliding surface 17, and the lock member 14 turns around the housing 13 to automatically return to a standby/lock state. Also, due to the falling prevention member 25, there is no possibility that the lock member 14 falls off even if the lock member 14 turns between the lock-member guide wall 15 and the flange 22.

Incidentally, an example wherein a shape of the first sliding surface 16 has the approximately vertical inclination has been explained; however, the first sliding surface 16 may have a shape of a convexly curved face upward, or a shape wherein a curvature of a curved face changes. Also, in the aforementioned embodiment, a case, wherein if one's finger is released from the bent portion 24 of the lock member 14, the lock member 14 returns to a standby/lock position by its own elastic force, has been explained; however, it may be structured to have a concave portion, a convex portion, or the like with which one portion of the lock member is engaged on a housing side to hold the release state.

In a case structured in the aforementioned manner, the release state of the lock member 14 can be maintained, so that there is no need of pulling out a heavy hose while turning the bent portion 24 with one hand, and the hose can be pulled out while holding the hose with both hands. Therefore, workability for releasing the lock mechanism can be improved. Also, since there is no protruding portion, in a case of disengaging the hoses, there is no possibility to damage other components. Also, in a case wherein the lock member 14 is returned to the standby/lock state, the bent portion 24 may be operated further to release an engagement with the concave portion, the convex portion, or the like which is engaged with the lock member.

As for a tubular-member lock mechanism for pipe, the tubular-member lock mechanism of the present invention can be used for piping of a radiator, an intake pipe (around a throttle valve), an intercooler, a battery pack, and the like for a construction machine. Also, the tubular-member lock mechanism may have the structure of cutting off the fluid in the same manner as the closing plug or the plug cap (blind lid).

EXPLANATION OF SYMBOLS

10 a tubular-member lock mechanism
11 an engagement portion
12 a tubular member
13 a housing
13*a* a hose connection portion
13*b* a mounting opening
13*c* a shallow groove portion
14 a lock member
14*a* tip portions
14*b* leg portions
14*c* bent portions
15 a lock-member guide wall
16 first sliding surfaces
17 second sliding surfaces
18 slits
19 a flange
21 a holding groove
22 a flange
23 a connection portion
24 a bent portion
25 a falling prevention member
26 an end edge
27 an end edge
28 a supporting point Incidentally, all contents of the specification, claims, drawings, and abstract of Japanese Patent Application No. 2014-053251 filed on Mar. 17, 2014 are cited in their entireties herein and are incorporated as a disclosure of the specification of the present invention.

What is claimed is:

1. A tubular-member lock mechanism, comprising:
a tubular member having an engagement portion formed on an outer periphery of the tubular member;
a cylindrical housing of which the tubular member is engaged at at least one end; and
a lock member through which the housing and the tubular member are locked to or released from each other,
wherein the housing includes a lock-member guide wall turnably guiding the lock member, at least two sliding surfaces symmetrically arranged at two sides of the housing, each of the at least two sliding surfaces including a first surface and a second surface facing the first surface, the first surface and the second surface having different inclinations, and a slit through which one portion of the lock member passes to engage the engagement portion of the tubular member mounted to the housing; and
when the one portion of the lock member engages the engagement portion of the tubular member, the tubular member is locked to the housing by an elastic force of the lock member, and
when the lock member is rotated on the lock-member guide wall of the housing by a rotational load, one tip portion of the lock member slides on the first surface of one of the at least two sliding surfaces, and another tip portion of the lock member slides on the second surface of another of the at least two sliding surface to spread the lock member to be released from the engagement portion of the tubular member, and the tubular member is released from the housing.

2. A tubular-member lock mechanism according to claim 1, wherein when the rotational load is applied to the lock member to be spread, the lock member abuts against an end portion of the slit to spread the lock member.

3. A tubular-member lock mechanism according to claim 1, wherein the lock member includes a bent portion bent in an axis direction of the housing, and the rotational load is applied to the bent portion to operate so as to spread the lock member.

4. A tubular-member lock mechanism according to claim 3, wherein the lock-member guide wall includes a gap controlling a turning range of the bent portion of the lock member at one portion thereof.

5. A tubular-member lock mechanism according to claim 4, further comprising a falling prevention member covering the gap of the lock-member guide wall from above with a predetermined interval to prevent the lock member from falling off.

6. A tubular-member lock mechanism according to claim 1, wherein when the rotational load is released, the lock member is returned by the elastic force.

7. A tubular-member lock mechanism according to claim 1, wherein the lock member is formed by a metal wire material having elasticity.

8. A tubular-member lock mechanism according to claim 1, wherein the at least two sliding surfaces include a first sliding surface arranged at one side of the two sides of the housing and a second sliding surface arranged at another side of the two sides of the housing, and the first surface of each of the first and second sliding surfaces has an inclination angle larger than that of the second surface of each of the first and second sliding surfaces;

the first surface of the first sliding surface is positioned at a position lower than the second surface thereof, and the first surface of the second sliding surface is positioned at a position lower than the second surface thereof; and when the one tip of the lock member slides on the first surface of the first sliding surface, the another tip of the lock member slides on the second surface of the second sliding surface; and when the one tip of the lock member slides on the second surface of the first sliding surface, the another tip of the lock member slides on the first surface of the second sliding surface.

9. A tubular-member lock mechanism according to claim 8, wherein the lock member includes a bent portion bent in an axis direction of the housing, connection portions outwardly extending from outer ends of the bent portion along an outer periphery of the housing, leg portions linearly extending from outer ends of the connection portions in a direction from the lock-member guide wall to the first and second sliding surfaces, and the tip portions extending from lower ends of the respective leg portions in a direction same as the bent portion; and the lock-member guide wall is arranged at an upper portion of the housing to turnably support the bent portion, the first and second sliding surfaces are arranged at a lower portion of the housing to contact the tip portions, the slit is arranged between the lock-member guide wall and each of the first and second sliding surfaces to pass the leg portions therethrough.

10. A tubular-member lock mechanism according to claim 9, further comprising a flange sandwiching the lock member with the lock-member guide wall, wherein when the rotational load is applied to the bent portion, the connection portion abuts against the flange as a supporting point to slide the one tip portion of the lock member on the first surface of the first sliding surface, and the leg portion abuts against an end edge of the slit as another supporting point to slide the another tip portion of the lock member on the second surface of the second sliding surface.

\* \* \* \* \*